United States Patent

Smith

[15] 3,666,083
[45] May 30, 1972

[54] CARRIER AND DRIVE MEANS FOR TWO-AXES TYPE REFRIGERATING CONVEYOR

[72] Inventor: Malcolm C. Smith, Hagerstown, Md.
[73] Assignee: Frick Company, Waynesboro, Pa.
[22] Filed: Feb. 13, 1970
[21] Appl. No.: 11,247

[52] U.S. Cl.................................................198/136
[51] Int. Cl...................................................B65g 17/06
[58] Field of Search ..........................198/136, 208, 195, 189

[56] References Cited

UNITED STATES PATENTS

| | | | |
|---|---|---|---|
| 3,348,659 | 10/1967 | Roinestad | 198/136 |
| 3,363,744 | 1/1968 | Green | 198/136 |
| 3,536,183 | 10/1970 | Locke | 198/136 |
| 3,412,476 | 11/1968 | Astrom | 198/136 X |
| 3,500,989 | 3/1970 | Cripe | 198/136 |
| 3,133,798 | 5/1964 | Feld | 198/136 X |
| 3,269,142 | 8/1966 | Mola | 198/136 X |

Primary Examiner—Edward A. Sroka
Attorney—A. Yates Dowell and A. Yates Dowell, Jr.

[57] ABSTRACT

Apparatus for freezing materials and including an endless conveyor disposed about a pair of drums in such a manner that rotation of the drums drives the conveyor. An independent motor is provided for driving the conveyor at a faster rate than the drums to apply a tension between the conveyor and the drums. A mobius inversion unit is provided so that opposite sides of the conveyor will alternately engage the drums in a manner to be driven thereby.

3 Claims, 8 Drawing Figures

Patented May 30, 1972

INVENTOR
MALCOLM C. SMITH

BY
ATTORNEYS

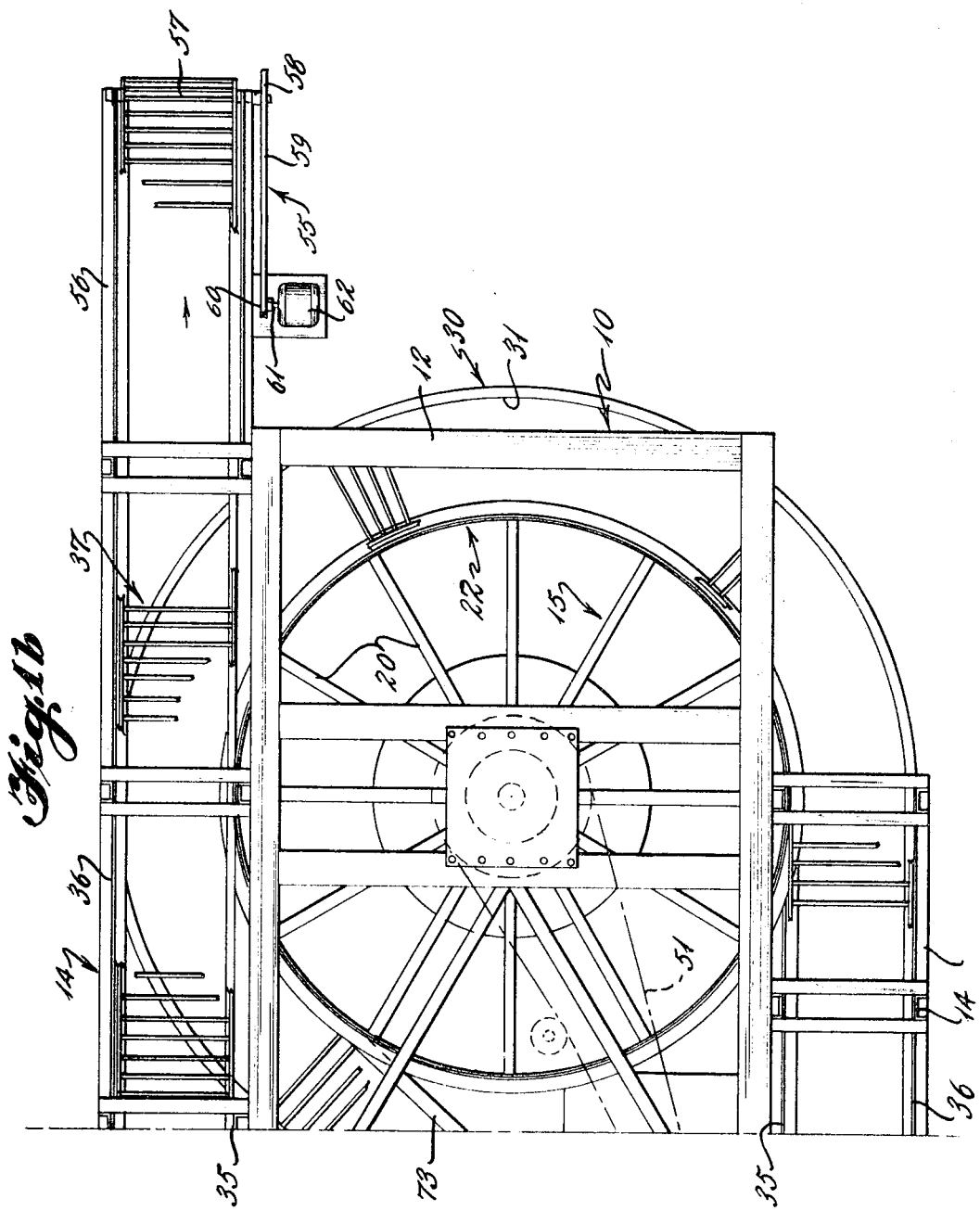

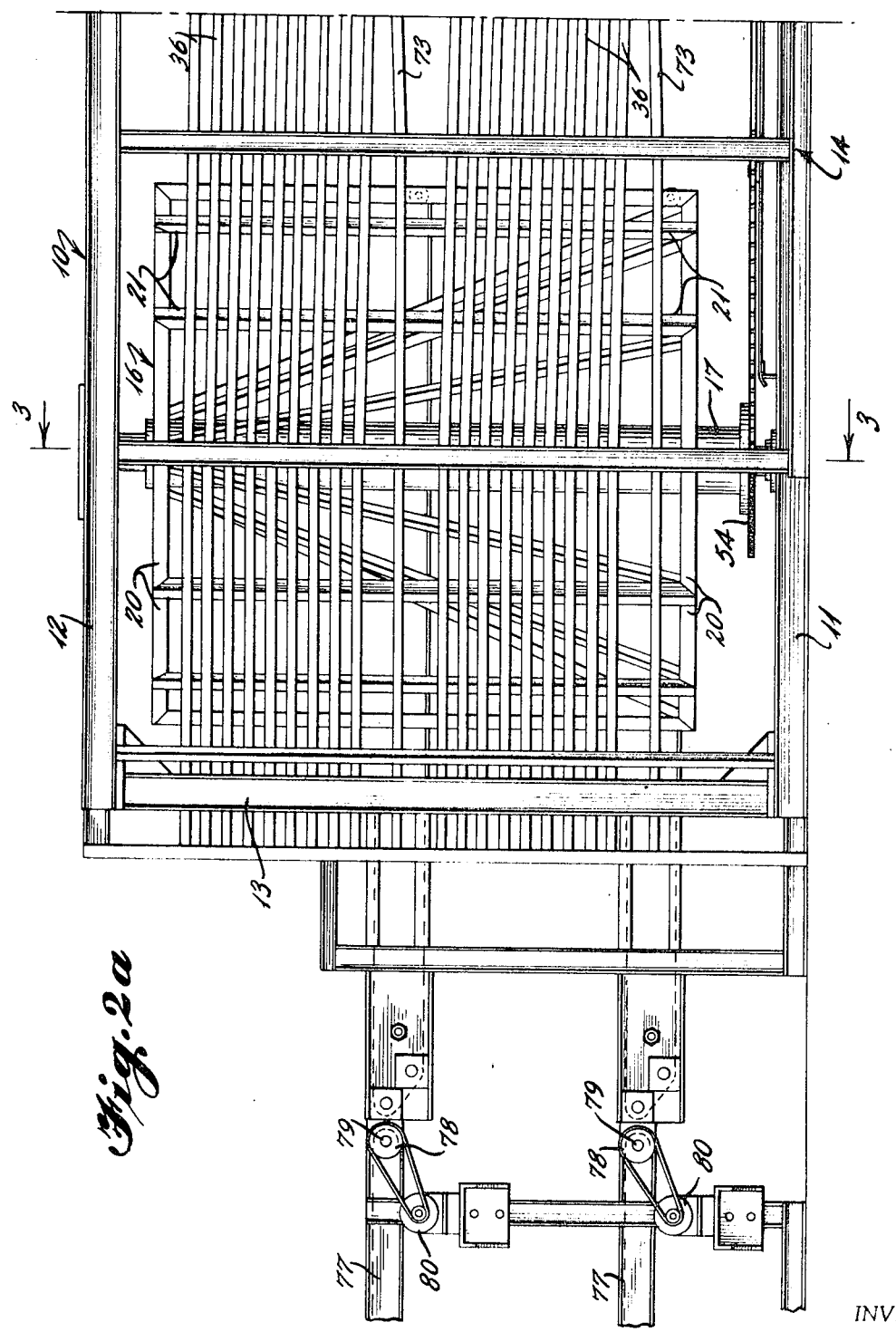

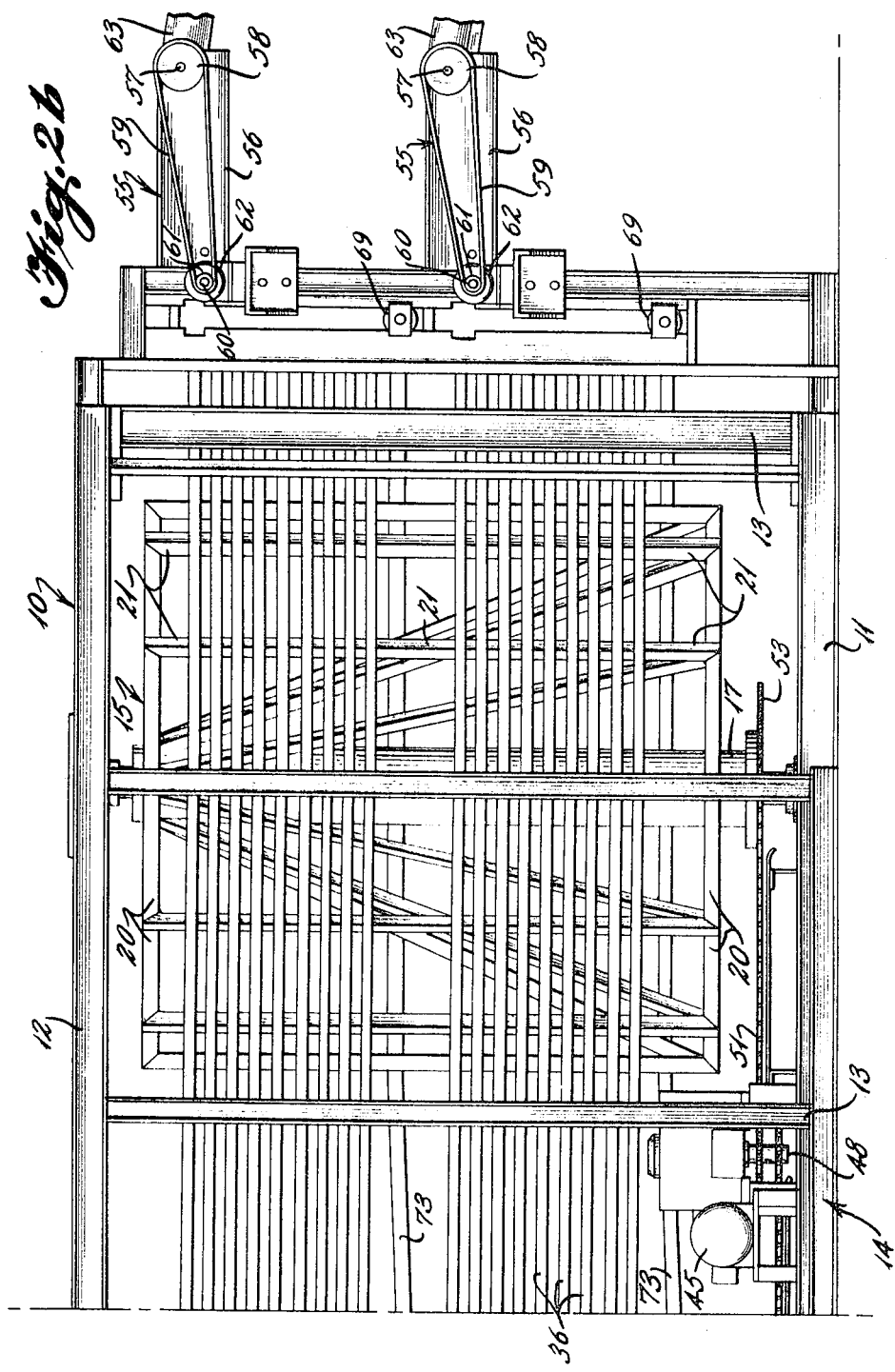

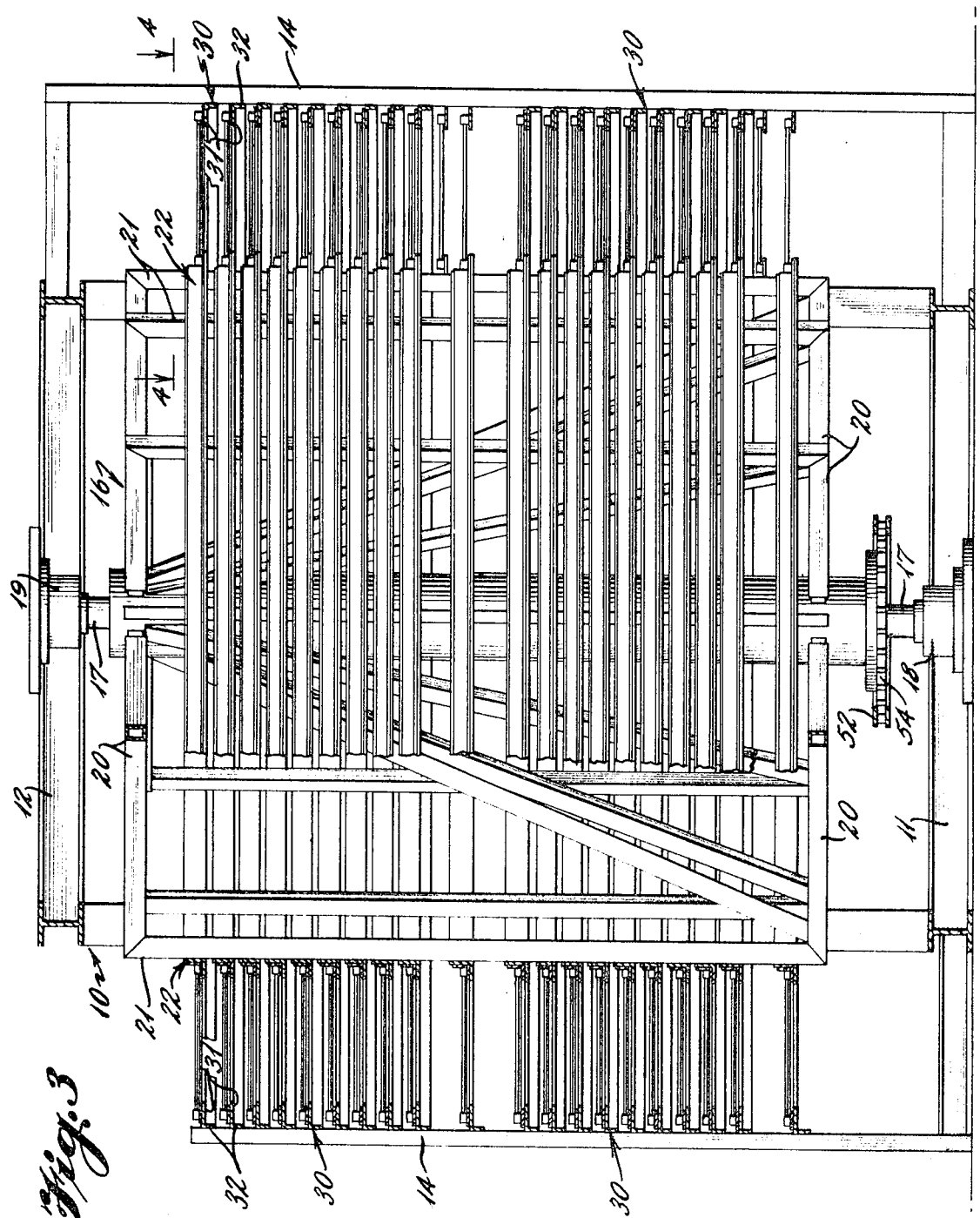

Patented May 30, 1972

INVENTOR
MALCOLM C. SMITH

BY
ATTORNEYS

INVENTOR
MALCOLM C. SMITH
BY
ATTORNEYS

CARRIER AND DRIVE MEANS FOR TWO-AXES TYPE REFRIGERATING CONVEYOR

BACKGROUND OF THE INVENTION

1. Field of the Invention

This invention relates generally to the refrigeration of various articles such as foods and the like and relates particularly to a refrigeration chamber having an endless conveyor wound about a plurality of drums and adapted to receive material to be frozen. Refrigeration equipment for producing a cooling flow of fluid over, around and through the conveyor can be located either within the compartment or exteriorly thereof and adapted to subject the material to a freezing stream of air or other fluid.

2. Description of the Prior Art

Heretofore many efforts have been made to provide refrigeration equipment which requires a relatively small area but which will subject the material to a freezing temperature for a sufficient length of time to thoroughly freeze such material. Initially refrigeration installations required relatively long horizontally disposed conveyors which were difficult to install and maintain, as well as to provide the cooling temperatures primarily because conveyors had to travel in a substantially straight line in order to be effective. With the development of a flexible conveyor belt which was capable of moving through a circular path, refrigeration equipment was developed which would occupy a much smaller area and in which it was much easier to maintain freezing temperatures.

An example of this type of structure is the DeMola et al. U.S. Pat. No. 3,269,142 which is assigned to the same assignee as the present application. While the DeMola patent constituted a substantial advance in the art, it contained certain inherent disadvantages. In this structure a pair of generally vertical shafts were provided each having a series of wheels which received and supported the entire width of the conveyor belt during the turning of such belt. Due to the construction of the wheels, a cross sliding between the wheel and the belt occurred each time the belt was received by and discharged from one of the wheels and this cross sliding resulted in a flaring outwardly of the belt as it was discharged from the wheel. Efforts were made to prevent this flaring of the belt by providing straightening rollers; however, this has not been satisfactory due to the additional friction losses, as well as the fact that friction between the conveyor and the straightening rollers has resulted in grooves being worn in the rollers.

SUMMARY OF THE INVENTION

The present invention is a refrigerating system having a conveyor with a pair of endless chains disposed in spaced relation to each other and connected by a plurality of closely spaced article supporting rods. The conveyor is mounted on a pair of generally cylindrical drums each of which has a plurality of spaced rings about which the conveyor is helically wound. The drums are driven simultaneously at substantially the same speed and rotation of such drums is adapted to drive the conveyor. At the discharge end of the conveyor a tension applying member is provided for pulling one side of the conveyor into intimate engagement with the drums and provide a frictional drive for the conveyor. After the material being frozen has been discharged from the conveyor, such conveyor is inverted so that the opposite side of the conveyor will engage the drums on the next pass through the device and wear on the chain will be equalized.

It is an object of the invention to provide a relatively small compact refrigeration unit having a pair of drums arranged in spaced relation to each other and adapted to provide a friction drive for the conveyor as well as means for applying a tension on the conveyor to regulate the frictional engagement between the drums and the conveyor.

BRIEF DESCRIPTION OF THE DRAWINGS

FIG. 1b is a top plan view of the other end thereof.
FIG. 2a is a side elevation of the structure shown in FIG. 1a.
FIG. 2b is a side elevation of the structure shown in FIG. 1b.
FIG. 3 is an end view.

DESCRIPTION OF THE PREFERRED EMBODIMENT

Figure 1A:
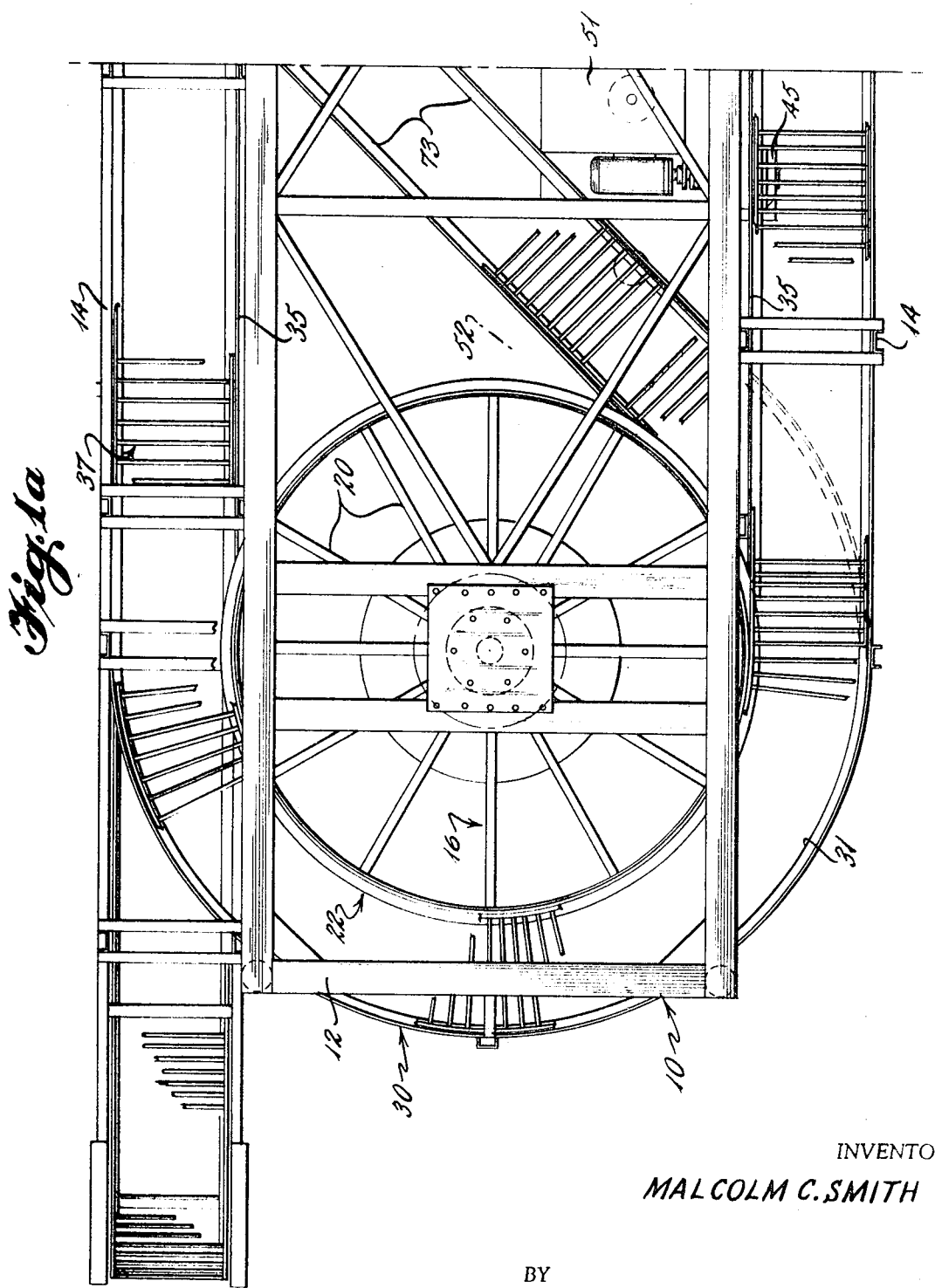
FIG. 1a is a top plan view of one end of the apparatus.

With continued reference to the drawings, an elongated main frame 10 is provided having a base 11 and an upper portion 12 connected by a plurality of generally vertical posts 13. The main frame 10 can be made of any desired material, such as structural channel members as shown, or may be made of any other desired structural members. The main frame is provided with an auxiliary frame 14 extending outwardly from a portion of each side for a purpose which will be described later.

A pair of drums 15 and 16 are mounted on the main frame 10 in spaced relationship to each other and each of said drums includes a shaft 17 having one end journaled in a thrust bearing 18 supported by the base 11 and the opposite end journaled in a bearing 19 supported by the upper portion 12. Each of the drums has a plurality of pairs of radially disposed spokes 20 extending outwardly from the upper and lower portions of the shaft 17. The outer ends of each pair of radial spokes are connected by generally upright connecting members 21.

Figure 5:
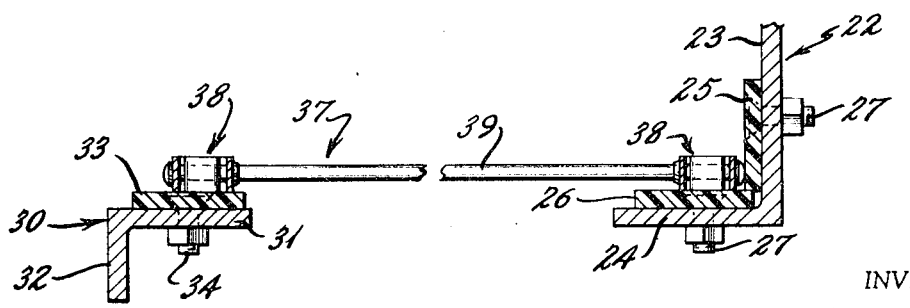
FIG. 5 is a section on the line 5—5 of FIG. 4.

As illustrated in FIG. 3, a series of rings 22 are mounted on the connecting members 21 of each drum in spaced vertical relation to each other and with the rings of one drum being staggered relative to the rings of the other drums. Each of the rings is generally angular in cross-section and includes an upwardly extending flange 23 attached to the connecting members 21 and an outwardly extending flange 24 disposed substantially normal to the flange 23. The upwardly extending flange of each ring is provided with a friction band or liner 25 and the outwardly extending flange 24 of each ring is provided with an anti-friction layer 26. The band 25 and the layer 26 are connected to the flanges 23 and 24, respectively, in any desired manner, as by fasteners 27 (FIG. 5).

Around each end of the frame 10 a series of semicircular tracks 30 are provided with one track being generally parallel with and in spaced relation to each of the rings 22. The tracks are generally angular in cross-section and include an upper inwardly extending flange 31 and a lower downwardly extending flange 32. Each of the tracks extends from the auxiliary frame 14 on one side of the main frame in a semicircular path to the auxiliary frame on the opposite side and preferably is supported intermediate its ends on the posts 13 of the main frame, as illustrated in FIGS. 1a and 1b. The upper flange 31 is provided with an anti-friction layer 33 such as teflon or the like which is connected to such upper flange in any desired manner, as by fasteners 34 (FIG. 5).

A plurality of inner slideways 35 are supported by the main frame 10 intermediate the drums 15 and 16 and such slideways are disposed at a slight angle so that the opposite ends terminate substantially in alignment with the staggered rings 22. A plurality of outer slideways 36 are located generally parallel with and in spaced relation to the inner slideways 35 and are supported by the auxiliary frame 14. The opposite ends of the outer slideways are connected to the tracks 30 to provide a helical path for a conveyor 37.

Figure 4:
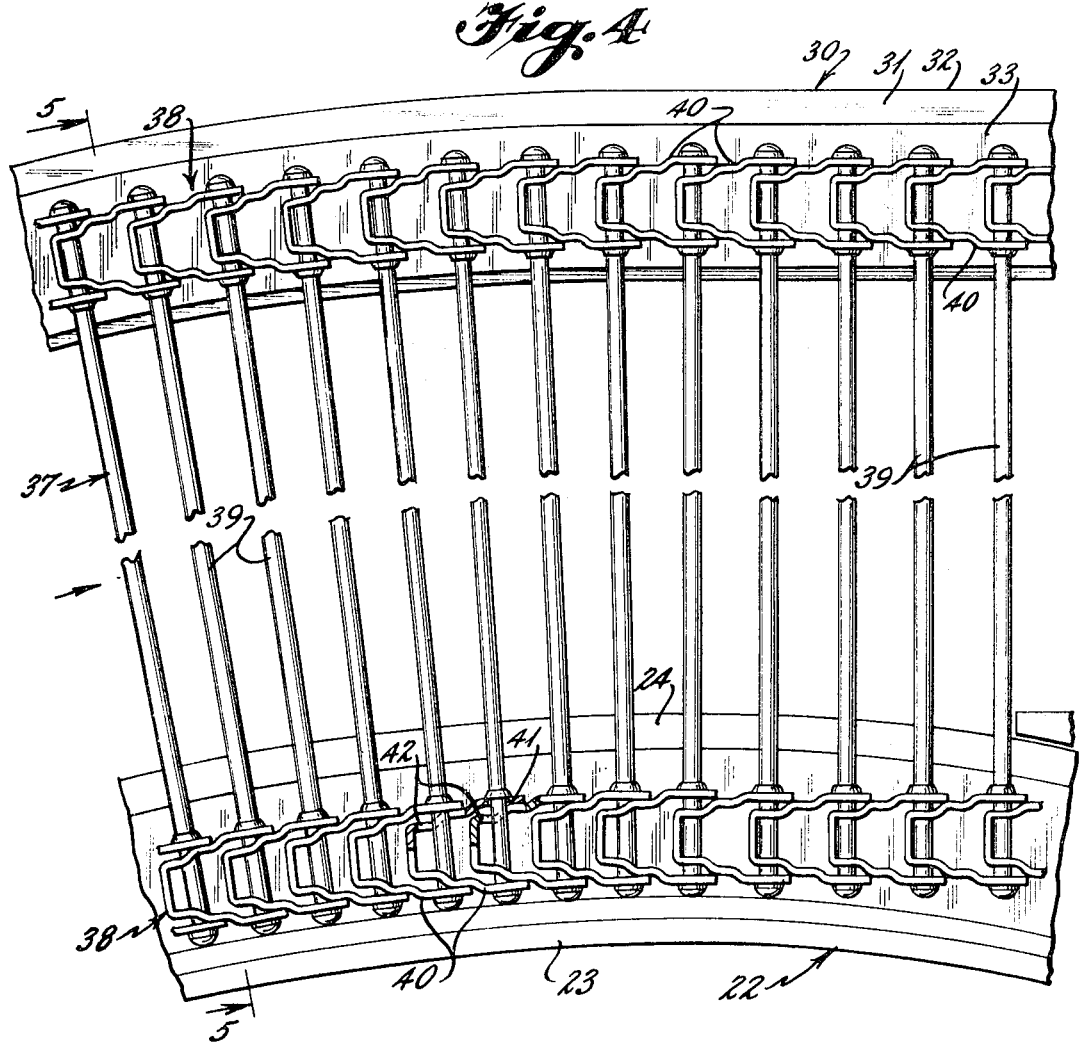
FIG. 4 is an enlarged fragmentary plan view of a portion of the conveyor chain on the line 4—4 of FIG. 3.

The conveyor 37 includes a pair of chains 38 connected by cross rods 39 adapted to support articles to be frozen. Each of the chains includes a multiplicity of substantially U-shaped links 40 each of which has a pair of aligned openings 41 (FIG. 4) adjacent the open end thereof and a pair of aligned slots 42 spaced from the openings 41. As illustrated the bight portion of one link is received within the open end portion of an adjacent link in such a manner that the cross rods 39 are received within the openings 41 of one link and extend through the slots 42 of an adjacent link. In this manner, when the conveyor is moving in a straight path, the cross rods will be generally parallel with each other and will be disposed at the rear of the slots 42; however, for the conveyor to move through a radius, the links 40 of the inner chain adjacent to the drum move into the next adjacent link so that the cross rods will move forwardly through the slots 42 to permit the cross rods to be disposed generally radially of the drum. Conveyors of this type are in commercial production by the Ashworth Chain Belt Company.

The drums 15 and 16 are adapted to be rotated simultaneously at substantially the same speed and in order to do this a power plant 45 is mounted on the base 11 between the drums 15 and 16. The power plant 45 may be an electric motor, a combustion engine, a fluid motor, or other source of power sufficient to drive the drums at the desired rate of speed. Preferably the power plant is an electric motor which can be controlled by a Varidyne drive unit produced by United States Motors, Inc., and which controls the speed of the power plant by a change in the electrical frequency. In other words, the power plant normally operates at 60 hertz per second and is started at approximately 40 hertz per second, after which the frequency is increased slowly to bring the speed up to normal. When the device is in use and something happens to prevent the drums from rotating in the conventional manner, the Varidyne drive unit will automatically reduce the electrical frequency so that the overload on the system will be substantially reduced. This automatic reduction of the electrical frequency also applies at the end of a run.

The power plant 45 includes a drive shaft 48 having a pair of drive sprockets 49 and 50 mounted thereon, and such drive sprockets are connected by chains 51 and 52 to sprockets 53 and 54 carried by the shafts of the drums 15 and 16, respectively. The sprockets 49 and 50 are substantially identical and the sprockets 53 and 54 likewise are substantially identical; however, the sprockets 53 and 54 may be of a different size than the sprockets 49 and 50 to either increase or decrease the speed of rotation of the drums 15 and 16 relative to the speed of rotation of the drive shaft 48.

The drums 15 and 16 are adapted to drive the conveyor 37 and in order to do this one of the chains 38 of the conveyor is maintained under a tension against the drums by a conveyor tensioning mechanism 55. As illustrated in FIG. 2b, the conveyor tensioning mechanism 55 is mounted on an outwardly extending support 56 carried by the main frame 10. The tensioning mechanism includes a shaft 57 having sprockets mounted thereon in alignment with and engageable by the chains 38 for applying a tension to the conveyor 37. A driven sprocket 58 is mounted on one end of the shaft 57 and is adapted to be driven by a chain 59 from a drive sprocket 60 mounted on the shaft 61 of a motor 62. Preferably the motor 62 is operated to drive the shaft 57 at a speed such that the chain sprockets carried thereby are trying to move the conveyor at a faster rate than the conveyor is being driven by the drums 15 and 16. Since the tensioning mechanism cannot drive the conveyor faster than the drums 15 and 16, slippage within the motor 62 and a tensioning of the conveyor 37 will result. As illustrated, the conveyor tensioning mechanism 55 is disposed at a discharge station so that when the chain extends around the shaft 57 the product, which has been frozen, will be discharged onto a discharge conveyor 63.

Figure 6:
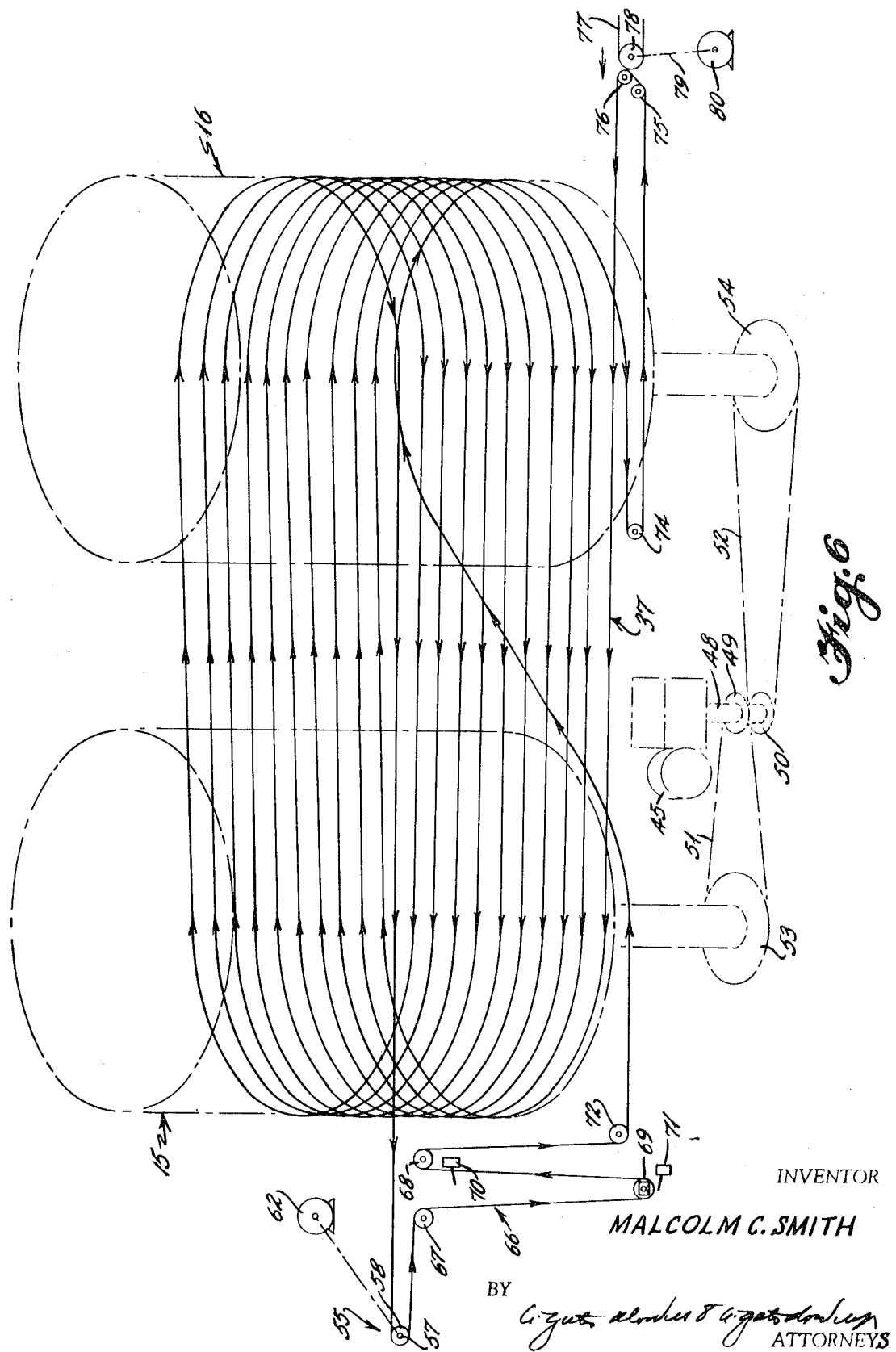
FIG. 6 is a schematic diagram of the present invention.

With reference to FIG. 6, a slack take-up mechanism 66 is provided so that after the conveyor 37 has discharged the frozen product onto the discharge conveyor 63, such conveyor will pass over the roller 67 and extend downwardly and then upwardly over a roller 68 forming a loop between the rollers 67 and 68. Since the conveyor 37 will be subjected to a wide range of temperatures which may range from 90° to 100° F when the device is not operative, to 0° F or below when the mechanism is freezing the product, a substantial allowance must be made for expansion and contraction of the conveyor under varying conditions. In the present instance, a floating roller 69 is supported by the conveyor 37 in the bight portion of the loop between the rollers 67 and 68. The floating roller 69 preferably is of sufficient weight to maintain a tension on the conveyor so that such conveyor can be driven by the drums 15 and 16. If desired, upper and lower limit switches 70 and 71 can be provided so that if the conveyor stretches or contracts an excessive amount one or the other of the limit switches will be engaged to stop operation.

The conveyor tensioning mechanism 55 maintains a tension on the conveyor as it passes around the drums 15 and 16 in much the same manner as a rope having several loops on the capstan of a winch. In order to prevent excessive frictional wear between the belt and the drum, it is desirable that the conveyor pass through a mobius inversion unit and be reversed with each pass through the machine so that the chain which is adjacent to the drums during one pass will be spaced from the drums on the next pass. In order to do this, the conveyor 37 extends downwardly from the slack take-up mechanism and passes around a roller 72 and then into a stationary support slide 73. The slide 73 supports opposite sides of the conveyor as the conveyor crosses diagonally from side to side to the lowermost ring of the drum 16.

After the conveyor has traveled through approximately 200° of rotation on the drum 16, such conveyor is discharged from the drum and passes over a roller 74 located between the drums 15 and 16. From the roller 74, the conveyor extends to a loading station defined by a pair of rollers 75 and 76 from which the direction of movement of the conveyor is again reversed. Thereafter, the conveyor 37 engages the drums in its oval spiral path through the device.

At the loading station a product to be frozen is deposited on the conveyor 37 by a feed conveyor 77 driven by sprockets 78 mounted on the shaft 79. The shaft 79 is driven from a motor 80 in timed relation to the movement of the conveyor 37. If desired, the motor 62 of the conveyor tensioning mechanism and the motor 80 of the feed conveyor may be connected to the Varidyne drive unit 46 so that such motors will be operated at a speed commensurate with the speed of rotation of the drums 15 and 16. In other words, when the drums are rotating at a normal speed, the motors 62 and 80 likewise will be rotating at a normal speed, and when the speed of rotation of the drums is decreased by the Varidyne drive unit the speed of rotation of such motors also will be decreased accordingly.

In the operation of the device, as soon as the compartment in which the product to be frozen is located has been sufficiently chilled, the power plant 45 is started at a relatively slow speed which is gradually increased until the conveyor 37 is being rotated at its normal operating speed. The food or other product to be frozen is brought into the device by the feed conveyor 77 and discharged onto the conveyor 37 at the loading station. Since the conveyor tensioning mechanism 55 maintains a constant tension between the conveyor 37 and the drums 15 and 16, rotation of such drums will drive the conveyor which is spirally wound about such drums. Preferably refrigerated air is blown over and around the product to be frozen and is of a sufficient temperature that such product is completely frozen by the time it is discharged from the discharge station onto the discharge conveyor 63. In cases where a relatively thick or dense product is being frozen, the conveyor 37 may extend the full heights of the drums 15 and 16; however, when relatively small or thin products are to be frozen, two or more conveyors could be disposed about the drums with each conveyor having independent feed and discharge conveyors associated therewith.

I claim:

1. Apparatus for driving two-axes type refrigerating equipment comprising a frame, a pair of spaced drums rotatably mounted on said frame on substantially vertical axes, each of said drums having a plurality of peripheral ring means spaced along the vertical axis thereof, the ring means of one drum being staggered relative to the ring means of the other drum, each of said ring means having a generally vertical portion and a generally horizontal portion, friction means mounted on said vertical portion of each of said ring means, anti-friction means mounted on said generally horizontal portion of each of said ring means, conveyor means semicircumferentially disposed about each of said ring means and being inclined between drums, said conveyor means being supported by the generally horizontal portion of each of said ring means, one edge of said conveyor means engaging the friction means of each of said ring means to provide the sole driving force for said conveyor means, means for rotating said drums at substantially the same speed, and means for tensioning said conveyor means, whereby said tensioning means causes said one edge of said conveyor means to intimately engage said friction means on said ring means so that rotation of said drums will drive said conveyor means.

2. The structure of claim 1 including track means mounted on said frame in spaced generally parallel relationship with the horizontal portion of each of said ring means, said track means and the horizontal portion of said ring means having anti-friction conveyor-engaging surfaces.

3. The structure of claim 1 in which said conveyor means is an endless belt, and a mobius inversion unit for inverting said belt so that opposite sides of the belt will engage said drums alternately.

* * * * *